United States Patent [19]

Stayner et al.

[11] 4,153,482

[45] May 8, 1979

[54] PROCESS FOR SOLDERING USING A PHOSPHORUS-CONTAINING LIQUID FLUX

[75] Inventors: Robert A. Stayner, Lafayette; Richard C. Fox, San Rafael; Thornton K. Jones, Greenbrae, all of Calif.

[73] Assignee: Chevron Research Company, San Francisco, Calif.

[21] Appl. No.: 851,670

[22] Filed: Nov. 15, 1977

[51] Int. Cl.$^2$ ............................................. B23K 35/34
[52] U.S. Cl. ........................................ 148/23; 228/207
[58] Field of Search .................................. 148/23–26; 228/207

[56] References Cited

U.S. PATENT DOCUMENTS

| 2,658,846 | 11/1953 | DeRosa | 148/25 |
|---|---|---|---|
| 3,597,285 | 8/1971 | Aronberg | 148/25 |
| 3,985,587 | 10/1976 | Choby | 148/24 |
| 4,060,191 | 11/1977 | Choby | 148/24 |

*Primary Examiner*—P. D. Rosenberg
*Attorney, Agent, or Firm*—D. A. Newell; J. J. DeYoung

[57] ABSTRACT

Disclosed is a process for joining two metal surfaces together with solder in which the surfaces to be soldered are first treated with an organic phosphorus-containing liquid flux which is relatively non-corrosive and which has a high degree of lubricity.

8 Claims, No Drawings

PROCESS FOR SOLDERING USING A PHOSPHORUS-CONTAINING LIQUID FLUX

BACKGROUND OF THE INVENTION

The invention relates to soldering and fluxes used in soldering processes. More particularly, the invention relates to a soldering process using a liquid flux.

Soldering is one of the oldest methods of joining two or more metal articles. Soldering involves the joining of two metallic surfaces by flowing between them by capillary attraction alloy or solder metals of lower melting point than the metals to be joined. The metal surfaces remain unmelted, but are solidly united when the solder alloy or solder metal solidifies.

Preparation of the joint surfaces is an important factor in soldering. With few exceptions, a flux composition is utilized. Fluxes are used to prevent the oxidation of the filler metal and of the surfaces of the metal being joined during the heating. The flux will also dissolve oxides which naturally exist on most metal surfaces as well as those that may form during the heating operation. Additionally, fluxes influence the surface-tension equilibrium in the direction of solder spreading.

Fluxes are applied to metal surfaces to be soldered by many methods, for example, brushing, spraying, dipping, etc. Generally, a liquid vehicle is utilized in the application of the flux, e.g., a petroleum solvent or water. The use of a liquid vehicle has certain advantages and disadvantages. One advantage is ease of application. One disadvantage occurs, however, in assemblies where the parts to be soldered are pretinned, assembled, dipped in a flux-containing bath, and heated to soldering temperature in an oven. The solvent or liquid vehicle must be evaporated first before soldering occurs and this results in a large loss of energy. If the solvent is non-aqueous, it also creates a large air pollution problem, due to emissions of volatile constituents into the atmosphere. Thus, it is desirable to use a flux which does not require a liquid vehicle for application.

Phosphoric acid is a well-known liquid flux, see for example, U.S. Pat. No. 3,985,587. Phosphoric acid, although being an excellent flux, creates many additional problems, particularly with automated soldering processes as are utilized in the automotive and electronics industries. One problem with phosphoric acid is that it is highly corrosive. Special safety precautions must be taken to protect workers using phosphoric acid. Secondly, special corrosion resistant machinery must be utilized. Thirdly, the phosphoric acid residues which remain after the soldering is accomplished must be removed since they can corrode and weaken the solder joint. Also, the excess flux must be removed since it can cause corrosion of the pieces soldered. Thus, many soldering processes also include a costly washing step to clean pieces of excess flux.

Another desirable feature of fluxes is that of lubricity. In automatic soldering processes, there is much moving machinery and lots of metal-to-metal contact as the parts to be soldered are arranged in orderly arrays within metal jigs after contact with the fluxing liquid. Thus, it is desirable that the flux act as a lubricant to the continuous flow of fixed parts as they are collected and assembled by automatic stacking machines.

Solid wax fluxes containing the phosphorus-containing acids of the present invention are disclosed in our copending application Ser. No. 811,505, filed June 30, 1977.

SUMMARY OF THE INVENTION

A process for joining a first metal surface to a second metal surface comprising (1) applying a liquid flux composition to at least one of said first or second surfaces, said liquid flux composition consisting essentially of an acid of the formula

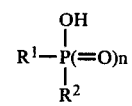

wherein $R^1$ and $R^2$ are hydrogen, hydroxyl, hydrocarbyl, hydrocarbyloxy or oxahydrocarbyl and wherein the total number of carbon atoms contained in said $R^1$ and $R^2$ groups is from 8 to 30 carbon atoms, and n is 0 or 1; and (2) soldering together said first and second surfaces.

DETAILED DESCRIPTION OF THE INVENTION

Means for applying liquid fluxes are well known in the art. The liquid fluxes of the present invention can be applied by brushing, dipping, spraying, foaming, wave fluxing, etc. These and other methods of flux application are well known and are described, e.g., in "Solders and Soldering" by Howard H. Manko, McGraw-Hill (1964), the entire disclosure of which is incorporated herein by reference.

The heart of the present invention resides in the choice of the fluxing agent.

The fluxing agents useful in the present invention may be represented by the following formula:

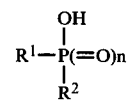

wherein $R^1$ and $R^2$ are hydrogen, hydroxyl, hydrocarbyl of 3 to 30 carbon atoms, or hydrocarbyloxy of 3 to 30 carbon atoms or oxahydrocarbyl of 4 to 30 carbon atoms, provided the total number of carbon atoms contained in the $R^1$ and $R^2$ groups is from 8 to 30 carbon atoms. Preferably n is 1. Preferably $R^1$ and $R^2$ are alkyl groups containing 3 to 20 carbon atoms, such as propyl, butyl, isobutyl, t-butyl, pentyl, hexyl, octyl, decyl, dodecyl, tetrapropenyl, hexadecyl, eicosyl, docosyl, and the like.

"Hydrocarbyl" as used herein is a monovalent organic radical composed essentially of hydrogen and carbon, and may be aliphatic, aromatic or alicyclic, or a combination thereof, and may be saturated or unsaturated. Typical hydrocarbyl groups are: octyl, octadecyl, pentacosyl, tricontyl, propylphenyl, dodecylphenyl, pentadecylphenyl, tetracosylphenyl and tricosylbenzyl.

The preferred hydrocarbyl groups are the saturated aliphatic straight-chain hydrocarbons, preferably containing from 4 to 24 carbon atoms and more preferably 9 to 13 carbon atoms.

"Hydrocarbyloxy" as used herein is a hydrocarbyl group attached to an oxygen atom by a single bond. Typical hydrocarbyloxy groups are: octyloxy, octadecyloxy, pentacosyloxy, tricontyloxy, propylphenoxy, dodecylphenoxy, pentadecylphenoxy, tetracosylphenoxy, and tricosylbenzyloxy.

"Oxahydrocarbyl" as used herein is an organic radical commonly known as the polyoxyalkylene radical and has the general formula

wherein R is H or a low-molecular-weight alkyl group of 1 to 6 carbon atoms, R' and R'' are independently H, methyl or ethyl, and n has an average value of 1 to 15. Typical oxahydrocarbyl groups are:

8-hydroxy-3,6-dioxaoctyl,
17-ethoxy-3,6,9,12,15-pentaoxaheptadecyl,
29-methoxy-3,6,9,12,15,18,21,24,27-nonaoxanonacosyl,
11-butoxy-3,6,9-trioxaundecyl, and
14-methoxy-3,6,9,12-tetraoxa-1,4,7,10,13-pentamethyltetradecyl.

The fluxing agents may more generally be described as comprising the alkyl and alkaryl phosphoric or phosphonic acid esters and the alkyl and alkaryl phosphinic acids, or the alkyl or alkaryl phosphorous or phosphonous acid esters and the alkyl and alkaryl phosphinous acids, or the alkyl and alkaryl esters of alkyl or alkaryl phosphonic or phosphonus acids.

Representative fluxing agents useful in the present invention are:

Dioctyl hydrogen phosphate
Didodecyl hydrogen phosphate
Dipentadecyl hydrogen phosphate
Octacosyl methyl hydrogen phosphate
Tridecyl pentadecyl hydrogen phosphate
Eicosyl nonyldecyl hydrogen phosphate
Tetradecyl dihydrogen phosphate
Pentacosyl dihydrogen phosphate
Heptadecyl propyl hydrogen phosphate
Methyl dodecyl hydrogen phosphate
Ethyl decyl hydrogen phosphate
Isopropyl eicosyl hydrogen phosphate
2-octylphenyl dihydrogen phosphate
4-dodecylphenyl dihydrogen phosphate
2,4-dibutylphenyl dihydrogen phosphate
4-tetradecylbenzyl dihydrogen phosphate
di(4-pentylphenyl) hydrogen phosphate
Ethylbenzenephosphonic acid
Methyl hydrogen ethylbenzenephosphonate
Tetradecyl hydrogen ethanephosphonate
Octadecyl phosphonic acid
Eicosyl phosphonic acid
Heptadecanephosphonic acid
4-dodecylphenyl hydrogen methanephosphonate
Octadecylphosphinic acid
Docosylphosphinic acid
Octylphosphinic acid
Dodecylphenylphosphinic acid
Didecyl hydrogen phosphite
Dodecylphenyl dihydrogen phosphite
Octyl benzyl hydrogen phosphite
Octadecyl dihydrogen phosphite
Hexacosyl dihydrogen phosphite
Nonyl tridecyl hydrogen phosphite
Butyl eicosyl hydrogen phosphite
Heptadecyl hydrogen phosphonite
Triacontyl hydrogen phosphonite
Docosyl hydrogen phosphonite
Dodecyl hydrogen propanephosphonite
Octyl hydrogen dodecanephosphonite
Tridecylphenyl hydrogen phosphonite
Tetradecyl hydrogen benzenephosphonite
Octadecane phosphinous acid
Undecylbenzene phosphinous acid
11-ethoxy-3,6,9-trioxaundecyl dihydrogen phosphate Many of these phosphorus-containing acids are available commercially. In general, they are prepared by heating the appropriate acid with the desired alcohol for a time sufficient to effect esterification. Complete descriptions and details of preparation of the phosphorus-containing acids are given in "Organic Phosphorus Compounds", G. M. Kosolapoff and L. Maier, Wiley-Interscience, 7 volumes from 1972 to 1976, and in particular:

Phosphonous Acid and Derivatives, V. 4, p. 255
Phosphinous Acid and Derivatives, V. 4, p. 463
Phosphorous Acid and Derivatives, V. 5, p. 21
Phosphinic Acid and Derivatives, V. 6, p. 1
Phosphoric Acid and Derivatives, V. 6, p. 211
Phosphonic Acid and Derivatives, V. 7, p. 7

The fluxing agents described above may be applied in diluted form but it is preferred to apply them in their pure form. The above fluxing agents have been found to be relatively noncorrosive and to have a high degree of lubricity.

After application of the fluxing agent to at least one of the two surfaces to be joined, the metal surfaces may be joined by any conventional soldering process. By "soldering together" it is meant the joining of two metal surfaces by solidified solder. Numerous processes for soldering are described on pages 183 to 210 in the aforementioned book by Manko, e.g., flame soldering, furnace soldering, hot-gas-blanket soldering, wave soldering, cascade soldering, hotplate soldering, soldering iron, and the solder pot.

EXAMPLES

The suitability of the above fluxing agents is illustrated by the following examples.

Lubricity was measured by a pin-on-ring tribometer test method and apparatus as described by D. Godfrey, Am. Soc. Lube. Eng. Trans. Vol. 7, pp. 24–31 (1964). In this test, a metallic ball of one test material is securely fastened in the jaws of a clamp to give an unmoving, hemispherical surface which presses against a rotating metallic ring. The test lubricant is then added to the surface of the rotatable ring.

The static coefficient of friction is determined at a ring rotation speed of 0.03 ft/min. Then the kinetic coefficient of friction is determined at 3.0 ft/min after a 30-minute breakin period. The load for these tests was 250 grams, and measurements were made at room temperature. The results are given in Table I.

TABLE I

| | Coefficient of Friction by Pin-on-Ring Test | | | | |
|---|---|---|---|---|---|
| Ex. | | Pin | Ring | Coefficient of Friction | |
| No. | Lubricant | Metal | Metal | Static | Kinetic |
| 1 | $H_3PO_4$ | Steel | Steel | 0.240,0.230 | 0.185,0.175 |
| 2 | $C_{13}H_{29}PO_4$[1] | Steel | Steel | 0.120,0.125 | 0.135,0.128 |
| 3 | $H_3PO_4$ | Solder[2] | Copper | 0.75 | 0.49 |
| 4 | $C_{13}H_{29}PO_4$ | Solder | Copper | 0.47 | 0.18 |

[1]Tridecyl dihydrogen phosphate
[2]A solder-covered bronze ball

Both sets of experiments (1,2 and 3,4) show the superiority of an alkyl dihydrogen phosphate over phosphoric acid as a lubricant for sliding surfaces. This is an especially important feature in solder operations wherein a solder-coated object is dipped in a liquid flux and then slid into place for soldering.

In the kinetic solder pin on copper-ring tests (3 and 4), the extent of stick-slip area was measured. For H₃PO₄, the range was 0.13, whereas with C₁₃H₂₉PO₄ the range was 1/10 this value, namely 0.012. This measurement also shows that parts to be soldered will slide together more smoothly and with less sticking when the liquid flux is an organic phosphorus-containing acid, as compared to phosphoric acid of the prior art.

In a measure of corrosivity, Timken rings and blocks were soaked in 100 ml of the liquid fluxing agents for 17 hours at room temperature. It was observed that the ring and block in phosphoric acid gave rapid evolution of hydrogen gas, and a precipitate. The surfaces were highly corroded. The ring and block lost a total weight of 5.52 grams. The ring and block in tridecyl dihydrogen phosphate showed no evidence of corrosion and had no loss of weight.

The above-treated rings and blocks were then tested by the method of ASTM d2714-68. In this test, the alpha machine was operated at 300 rpm, with a 90-pound load, at ambient temperature for 15 minutes. At the end of this time, the wear-scar volume loss was 0.21 mm³ for the phosphoric acid-treated parts and 0.016 mm³ for the tridecyl dihydrogen phosphate-treated parts. These comparisons show that the phosphoric acid is much more corrosive than tridecyl dihydrogen phosphate, and indicate that the usual iron or steel machinery being used to handle the flux-wetted parts would soon become excessively corroded.

Copper strips were tested by soaking for 16 hours at ambient temperature in liquid fluxes. At the end of this time, there was no evidence of corrosion. After a total soak time of 120 hours, the specimen in phosphoric acid had lost 0.0093 gram and the one in tridecyl dihydrogen phosphate had lost 0.0004 gram.

Solder- (80/20 lead/tin alloy) coated tubes were tested with 2 drops of each liquid flux and allowed to stand for 24 hours at room temperature. At the end of this time, the phosphoric acid drops had corroded completely through the solder layer. The drops of tridecyl dihydrogen phosphate discolored the solder, but did not corrode it. These results also show the surprisingly greater corrosivity of phosphoric acid as compared to tridecyl dihydrogen phosphate. Thus, although both substances are effective fluxing agents, the phosphoric acid causes corrosion and lubrication problems that, surprisingly, tridecyl dihydrogen phosphate avoids.

What is claimed is:

1. A process for joining a first metal surface to a second metal surface comprising
    (1) applying a liquid flux composition to at least one of said first or second surfaces, said liquid flux composition consisting essentially of an acid of the formula

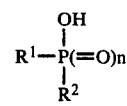

wherein $R^1$ and $R^2$ are hydrogen, hydroxyl, hydrocarbyl, hydrocarbyloxy or oxahydrocarbyl and wherein the total number of carbon atoms contained in said $R^1$ and $R^2$ groups is from 8 to 30 carbon atoms, and n is 0 or 1; and
    (2) soldering together said first and second surfaces.

2. The process of claim 1 wherein said hydrocarbyl and hydrocarbyloxy groups contain from 4 to 24 carbon atoms.

3. The process of claim 1 wherein n is 1 and $R^1$ is hydroxyl.

4. The process of claim 3 wherein $R^2$ is tridecyloxy.

5. The process of claim 3 wherein $R^2$ is dodecylphenoxy.

6. The process of claim 1 wherein n is 0.

7. The process of claim 1 wherein $R^1$ and $R^2$ are octyloxy.

8. The process of claim 1 wherein said liquid flux is tridecyl acid phosphate.

* * * * *